(No Model.)

W. H. DODGE.
MEANS FOR SECURING PULLEYS ON SHAFTS.

No. 383,281. Patented May 22, 1888.

Witnesses:
J. B. McGirr.
A. C. Rawlings.

Inventor:
W. H. Dodge.
By his Atty

UNITED STATES PATENT OFFICE.

WALLACE H. DODGE, OF MISHAWAKA, INDIANA.

MEANS FOR SECURING PULLEYS ON SHAFTS.

SPECIFICATION forming part of Letters Patent No. 383,281, dated May 22, 1888.

Application filed September 5, 1887. Serial No. 248,813. (No model.)

*To all whom it may concern:*

Be it known that I, WALLACE H. DODGE, of Mishawaka, in the county of St. Joseph and State of Indiana, have invented new and useful Improvements in the Means for Securing Pulleys on Their Shafts; and I do hereby declare that the following is a full and accurate description of the same, reference being had to the accompanying drawings, wherein—

Figure 1:
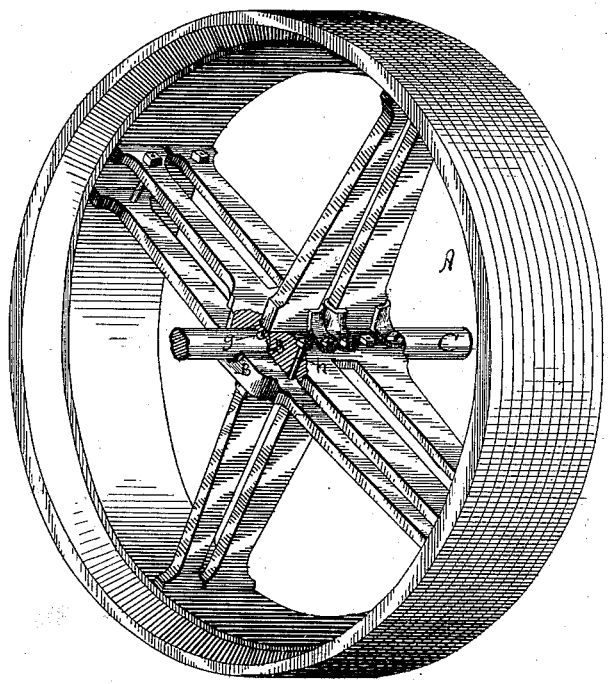
Figure 2:
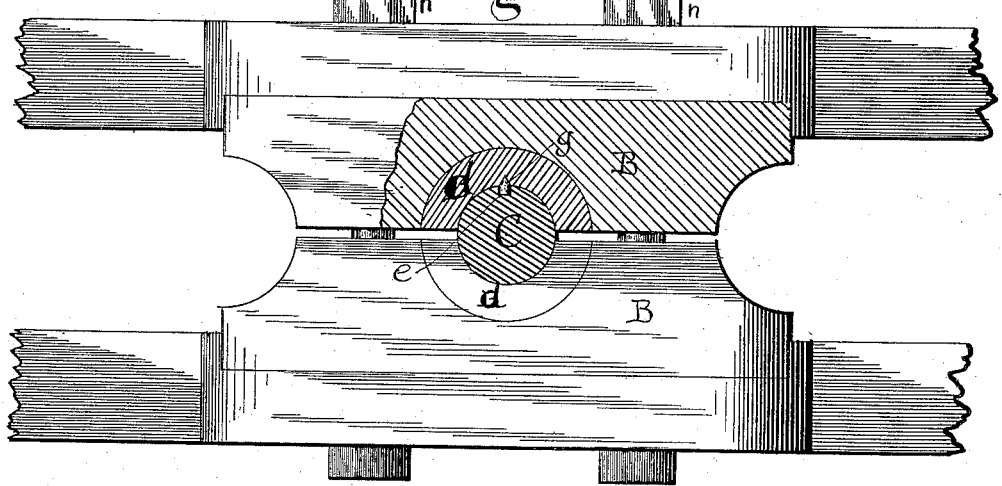
Figure 3:
Figure 4:

Figure 1 is a perspective, partly in section, showing my improvement. Fig. 2 is a side elevation, partly in section, of the hub. Figs. 3 and 4 are perspective details.

My improvement relates more particularly to wooden split pulleys, though, as will appear, it is not necessarily confined to wooden pulleys, as it may be applied to separable metal pulleys by proper preparation. For convenience, however, the following description will refer to the application of said invention to a wooden split pulley, such as that shown in Fig. 1. The key-seat referred to, being a longitudinal groove cut in both shaft and pulley-hub, is troublesome and costly to make, and weakens both shaft and pulley. When a shaft is already hung, a new key-seat can only be cut by hand, or by taking the shaft out of the hangers. The set-screw is only effective by the application of power, which tends to separate the pulley from the shaft, and is in fact a bursting strain upon the pulley, and it holds only by the friction due to its pressure upon the shaft. The simple clamping-pressure does not mar the shaft, and is generally an element of strength in the pulley; but under some conditions the pulley will creep upon the shaft.

The object of my invention is to obviate this slight movement in a pulley clamped on the shaft by means which will not injure the shaft or be difficult to apply, like a key and longitudinal key-seat, and which will not weaken the pulley, like a set-screw.

My invention comprises a separable pulley having its central bearing portion, either its hub or a separable bushing therein, of soft material—such, for example, as wood—a shaft having one or more recesses in its periphery, and a key-piece—such as a pin—having its outer end sharpened and its inner end of such shape and size as to fit the recess. It will be seen that by this combination of parts the trouble and time involved in obtaining an accurate registry between recesses in both hub and shaft and in getting an accurate fit of the key-piece in both of such recesses are saved. It is simply necessary to locate the recess in the shaft at approximately the point desired, place therein the key-piece, and finally, having adjusted the pulley accurately in the line desired, draw its parts firmly together by means of its clamping devices. The outer end of the key will seat itself firmly in the central portion of the pulley and the latter secured in place. It will also be seen that the pulley may be afterward adjusted longitudinally on the shaft for a distance nearly equal to twice the width of the hub without making a new recess in the shaft.

A is a pulley-rim, and B is the hub of the same connected with said rim by arms or spokes.

C is the shaft.

The pulley A, as represented in Fig. 1, is a separable or split pulley having a wooden hub or a wooden bush, *d*, or both. The wooden pulleys shown in the drawings are usually provided with wooden hubs and with bushes fitted to the shaft on the inside and fitted to the bore of the hub on the outside. When the location of the pulley on the shaft C has been determined, one or more shallow cells or pits, *e*, about three-eighths of an inch in diameter, are drilled in the shaft, penetrating about one-fourth of an inch. These pits may be drilled while the shaft is in the hangers as well as while unhung by means of any proper portable drill, and they will not appreciably weaken the shaft. In each of said pits I place a small steel cylinder, *g*, with a conical end projecting above the surface of the shaft. The wooden center or bushing is then placed on the pin or pins *g*, and when the clamping-screws *h h* are tightened up the conical points are forced to embed themselves in the wood and render it impossible for the pulley to creep without an application of power sufficient to destroy the center or bushing, as the case may be.

The pins *g* are provided with conical ends for the purpose of enabling them to easily penetrate the wood of the hub or bushing; but the form of said end is not otherwise material so long as it is beveled or sharpened. It is of importance, however, that the pit *e* shall have its walls perpendicular to the shaft-axis, or thereabout, and that the pin $g$ shall be corresponding in shape, so that said pin cannot rotate in its cell under the strain of the pulley at work.

Having described my invention, I claim as new—

The separable pulley having a central bearing portion of soft material, in combination with the shaft having a recess formed therein, a key piece or pin adapted to fit the recess and having a sharp outer end, and clamping devices, as the screws $h$, for forcing together the parts of the pulley and causing the outer end of the pin to seat itself in the pulley at the desired point, substantially as set forth.

WALLACE H. DODGE.

Witnesses:
W. B. HOSFORD,
D. O. FONDA.